United States Patent
Mueller et al.

[11] 3,729,703
[45] Apr. 24, 1973

[54] SUM DIFFERENCE TRANSDUCER SHADING

[75] Inventors: William J. Mueller, Portsmouth; Frank W. Cuomo, East Providence, both of R.I.

[73] Assignee: The United States of America as represented by the Secretary of the Navy

[22] Filed: Jan. 27, 1966

[21] Appl. No.: 523,459

[52] U.S. Cl. .................... 340/6 R, 114/23, 340/6 S, 340/11
[51] Int. Cl. ............................................... G01s 3/80
[58] Field of Search .................. 340/6 R, 6 S, 8 R, 340/11; 114/23

[56] References Cited
UNITED STATES PATENTS

| | | |
|---|---|---|
| 3,025,493 | 3/1962 | Brooks .................................. 340/6 |
| 3,082,401 | 3/1963 | Bland et al. ........................ 340/11 |
| 3,160,848 | 12/1964 | Rey, Jr. et al. ..................... 340/6 |

Primary Examiner—Richard A. Farley
Attorney—J. P. Dunlavey and J. O. Tresansky

[57] ABSTRACT

A torpedo homing system providing wide angle steering information from a directional transducer sum and difference signals. A transducer having columns of pick-up elements arranged in quadrants to provide the sum and difference signals wherein a portion of the windings normally designated for the elements of each quadrant are wound on some of the elements in the adjacent quadrants to extend the region of correct torpedo steering.

5 Claims, 13 Drawing Figures

Patented April 24, 1973

INVENTORS
WILLIAM J. MUELLER
FRANK W. CUOMO

BY

ATTORNEY

AGENT

INVENTORS
WILLIAM J. MUELLER
FRANK W. CUOMO

INVENTORS
WILLIAM J. MUELLER
FRANK W. CUOMO
ATTORNEY
AGENT

STEERING SIGNAL VS. TARGET ANGLE

INVENTORS
WILLIAM J. MUELLER
FRANK W. CUOMO

SUM DIFFERENCE TRANSDUCER SHADING

The invention described herein may be manufactured and used by or for the Government of the United States of America for governmental purposes without the payment of any royalties thereon or therefor.

This invention relates to a signal processing system employing underwater directional transducers and more particularly to a processing system and method of providing wide angle steering information from transducer sum and difference signals.

In torpedo homing systems of the type contemplated, steering information is obtained by taking the sun and difference of signals from the left and right halves of a transducer for a target in the horizontal plane and from the top and bottom halves for a target in the vertical plane. Sound reflected from a target impinging upon one-half of the transducer before the other provides an indication that the target is not centered. After appropriate comparisons of the sum and difference transducer output signals, electromechanical steering apparatus responds to bring the torpedo into line with the target.

The pattern for one-half of a transducer is defined as a difference beam or a directivity pattern while the term, difference pattern, refers to the signal pattern which is obtained when signals from transducer halves are subtracted. The sum beam or sun pattern is the total transducer signal produced by adding the voltages generated by the individual transducer elements.

In the past, homing systems have been proposed employing sum and difference signals from directional transducers. One such transducers consisted of a planar array of magnetostrictive elements arranged in pairs and stacked in columns. The transducer was geometrically divided into quadrants and had individual to each quadrant difference windings wound on the magnetostrictive elements to give quadrant directivity pattern signals which were fed to bridge circuitry. A sum signal for comparison was provided by sum windings wound on each of the magnetostrictive elements in series circuit with each other but separate from the difference windings. The magnetostrictive elements of each quadrant were shaded from the center to the outside of the transducer by varying the number of windings on each element. Final steering control was obtained by comparing phase shifted sum signals and difference signals to provide a steering signal which was proportional to the product of the magnitudes of the sum and difference voltages.

At least two problems have been present in the past with directivity transducers of the type described. These problems are that of the tendency for false steering at target bearings other than that of a small region near the center position of transducer halves and that of large sensitivity to noise sources at wide bearing angles. Because of the large phase angles involved as the bearing angle widens, false steering arises at relatively narrow target bearing angles. Theoretically the steering signal depends only on the difference in magnitudes of the signals obtained from adding phase shifted sum voltages and the difference voltages so that large difference voltages at wide bearing angles should have only a noise effect on the home circuitry. However, it being difficult to maintain a precision balance in the homing circuitry, large difference voltages can cause the circuitry to introduce phase or magnitude distortion which enhances any ill effects on steering signals. The theoretical limit for correct steering is reached with transducers of the type considered as the bearing angle approaches 40°, although experimentally false steering often occurred at angles as low as 18° for targets in the horizontal plane. A more satisfactory homing system which had a wider region of correct steering and which had lower sensitivity to target signals outside of the steering region was therefore highly desirable.

The general purpose of this invention is to provide a underwater directional homing transducer and method of shading the transducer which embraces all the advantages of similarly employed transducers and possesses none of the aforedescribed disadvantages. To attain this the present invention contemplates a unique winding arrangement of the pick-up elements between the transducer quadrants whereby improved steering signalling is achieved.

An object of the present invention is to provide a signal processing system for a homing system wherein correct steering is maintained over a wide bearing angle region and sensitivity to signals outside said region is reduced.

Another object is the provision of a directional transducer which detects correctly the bearing of a target over a wide region and which is relatively insensitive to sound sources at wide target angles.

Still another object is to provide a method of shading a sum and difference signal generating transducer whereby false steering does not occur at narrow target bearing angles and sensitivity of the transducer to sound sources at wide bearing angles is minimal.

Yet another object is the provision of a transducer having vibratory pick-up elements arranged in stacks in a planar array divided geometrically into quadrants which has low sensitivity to targets at angles where false crossovers associated with the sum pattern of the array configuration can not be eliminated and which eliminates occurrence of false steerings at small target angles.

A further object is the provision of a transducer shading method for arranging the strengths of individual magnetostrictive stacks in a four quadrant array of magnetostrictive elements to get distinct target bearing information from a remote sound source.

Other objects and many of the attendant advantages of this invention will be readily appreciated as the same becomes better understood by reference to the following detailed description when considered in connection with the accompanying drawings in which like references numerals designate like parts throughout the figures thereof:

FIG. 3b is a graphical representation of the vector addition and subtraction of transducer signals from the quadrants of FIG. 3a;

Figure 1:
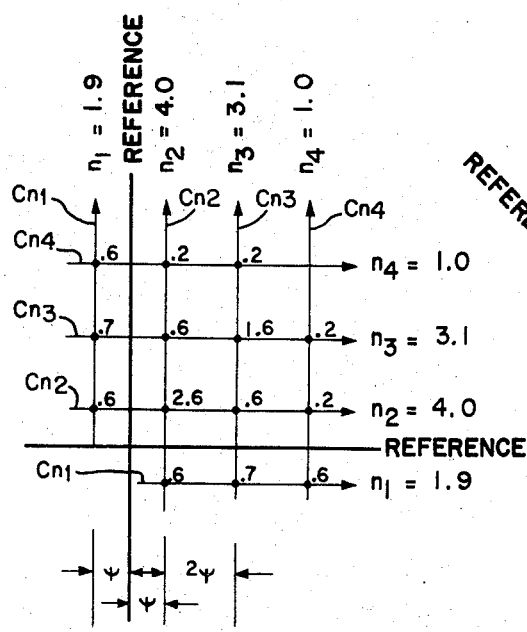
FIG. 1 illustrates a transducer winding arrangement for one quadrant of a symmetrical directional transducer with references in the horizontal and vertical planes.

Most of the structural design of the transducer of the present invention is the same as those in the prior art similar to that disclosed by Bland et al. in U.S. Pat. No. 3,082,401 Mar. 19, 1963. The significant improvement, however, is the novel shading arrangement and method of obtaining same. FIGS. 1 and 2 show relative number of windings in non-normalized form which have been found to give satisfactory directional transducer shading. Before discussing FIGS. 1 and 2 in detail reference is first made to FIGS. 3 and 4 for a general discussion of torpedo homing system performance.

Figure 2A:
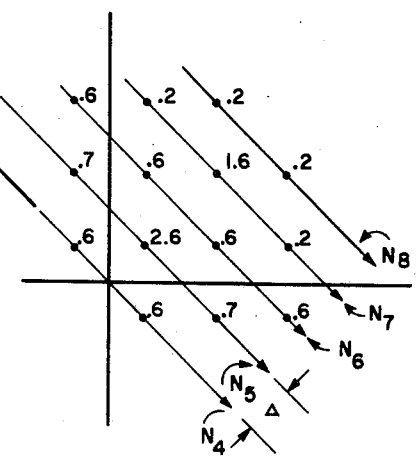
FIGS. 2a and 2b illustrate the transducer winding arrangement of FIG. 1 for two quadrants with a reference in the diagonal plane.
Figure 2B:
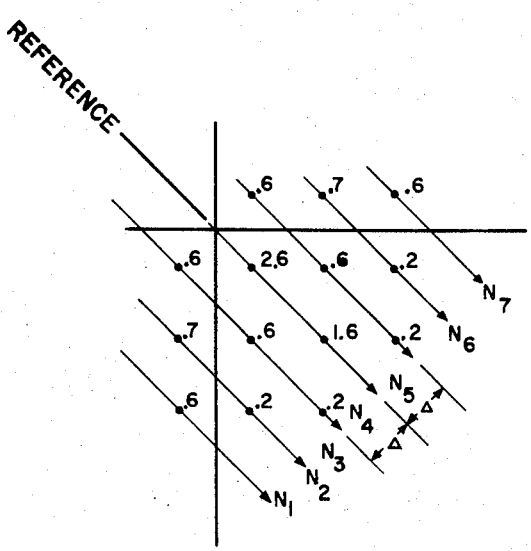
Figure 3A:
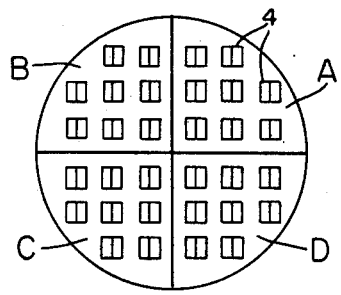
FIG. 3a illustrates the geometrical arrangement of transducer quadrants.

FIG. 3a shows the quadrants A, B, C and D of a transducer. Each of the quadrants have pick-up vibratory elements 4 such as the magnetostrictive elements shown in the Bland et al. reference. The transducer of the present invention has pairs of these elements positioned at the relative positions shown in FIGS. 1 and 2 with eight such pairs arranged in three columns in each quadrant. Complete symmetry of element size, spacing and magnetostrictive strength is maintained among the quadrants.

Figure 3B:
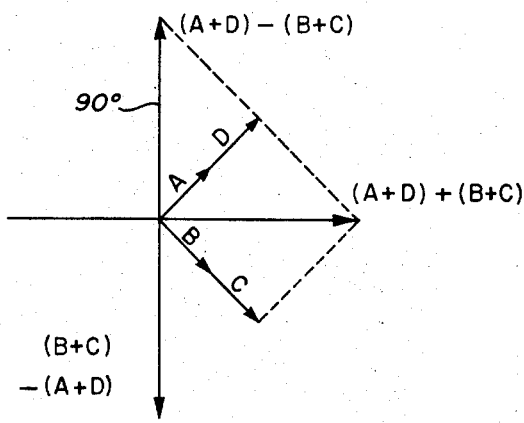

With a target located at a bearing wider than zero, sound will impinge upon the elements lying nearest the sound source first and signals generated by the transducer in the nearest quadrant or transducer half lead those of signals generated by the elements farther from the sound source. If, for example, the target is in the horizontal plane the signals from one-half of the transducer, quadrants A plus D in FIG. 3a are compared with signals from the other half, quadrants B plus C. FIG. 3b shows, vectorially, signals from the transducer half, A and D, leading signals from the other half, B plus C, when a target is nearer A and D. The homing system produces difference voltages by subtracting signals from the transducer halves giving, for example, the vector voltages $(A + D) - (B + C)$ and $(B + C) - (A + D)$.

Because of the symmetry of the transducer halves, the difference voltages for targets in the horizontal or vertical planes will always be in the 90° and 270° phase positions.

The homing system also produces a sum voltage $(A + D) + (B + C)$ which is always in the horizontal or 0° and 180° phase positions. Some fraction for example, ½, of the sum voltage is rotated 90° in phase and added to the difference voltages. If the rotation is clockwise the sum voltage increases the 270° difference voltage and reduces the 90° difference voltage. At this point any difference in magnitudes of these voltages results in a steering signal. Should a target lie dead ahead, $(A + D)$ is in phase with $(B + C)$ so the difference signals between halves is zero and the steering signal or difference between magnitudes of the rotated sum voltage added to the difference voltages is also zero. If the target is moved in the horizontal plane to the other side of the transducer (B and C), the vector position interchanges and the steering signal reverses from that obtained in FIG. 3b. The same analysis can be applied to targets in planes other than the horizontal except that signals from quadrants in each half of the transducer will not be in phase. When the signals from the transducer halves pass 90° and 270°, the sum voltage reverses polarity causing false steering to result.

Considering now FIGS. 1 and 2 for one embodiment of the invention the relative number of windings per pair of vibratory elements is shown in non-normalized form for single quadrants and those elements adjacent the quadrants. Complete symmetry is assumed so that each of the quadrants is wound in the same manner. In FIG. 1 the references are the horizontal and vertical planes while in FIGS. 2a and 2b the reference is in a 45° diagonal plane. The elements are separated a small distance $(d)$ with eight pairs of magnetostrictive elements arranged in each quadrant as shown. The strength of elements are expressed as amplitude ratios which indicate the number of turns on each element in columns $Cn_1$ to $Cn_4$. Since the planar array of the transducer has circular symmetry the pattern in a plane containing the principal axis of the array and normal to the columns of the elements is identical to that produced by a line of segments whose strengths are the sums of the strengths of the elements in each column. For reference waves in the plane shown in FIG. 1 the phase factor $\psi$ represents the phase lag or lead of each element referenced to the central planes of the array, and target waves in the 45° planes show the phase factor $\Delta$ representing the phase lag or lead of each element referenced in the central plane.

It was desired that nulls in the directivity patterns be obtained for $\psi$ equal to $\pi/2$ and for $\Delta$ equal to $\pi$. Under these conditions it is found that, $$n_1 + n_3 = n_2 + n_4 \qquad \text{equation (1)}$$

where $n_1$, $n_2$, etc. if the total winding strength of the elements in the respective columns, and $$N_1 + N_3 + N_5 + N_7 = N_2 + N_4 + N_6 + N_8 \qquad \text{equation (2)}$$

where $N_1$, $N_2$, etc. is the total winding strength of the elements in the respective diagonal lines.

Figure 4:
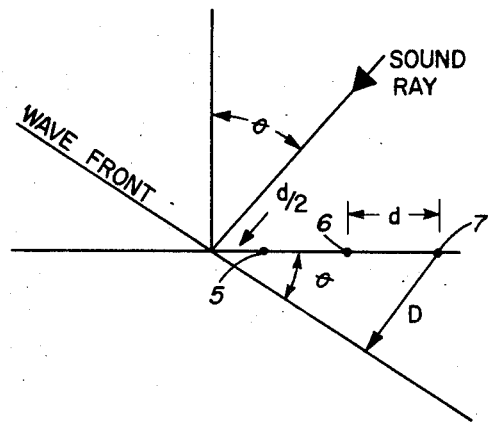
FIG. 4 illustrates the geometry used in calculating directivity patterns with a phase reference point located at the center of a transducer.

The geometry of FIG. 4, illustrates graphically a bottom view of one quadrant of the transducer elements represented in FIG. 1. All the elements in a column appear as a single element 5, 6, 7 to a sound ray coming from a bearing angle $\theta$ along with a wave front of constant phase perpendicular to the ray. When the center of the transducer is used as a phase reference point a wave front will pass the outer element 13 and travel a distance D before reaching the reference point.

Element 12 is separated from elements 11 and 13 by a distance ($d$) and element 11 is spaced $d/2$ from the reference transducer center. The distance $D = 5/2\, d \sin \theta$ and the phase angle $\psi = (360/\lambda) D$, where $\lambda$ is the wave length. The phase angle $\psi$ for element 13 then becomes $715 \sin \theta$ (in degrees). In a similar manner the phase angles for elements 12 and 11 can be shown to be $430 \sin \theta$ and $143 \sin \theta$ respectively.

Referring again to FIGS. 1 and 2 the number of turns of winding on the elements were determined analytically based on the number of lines of segments existing in each plane being considered as well as the phase relation of each line with respect to the reference. The element strengths of FIGS. 1 and 2 were obtained from the following mathematical relationships:

$$n_1^2 + n_2^2 + n_3^2 + n_4^2 + 2(n_1 n_2 + n_2 n_3 + n_3 n_4) \cos 2\psi + 2(n_1 n_3 + n_2 n_4) \cos 4\psi + 2(n_1 n_4) \cos 6\psi = R^2 \quad \text{equation (3)}$$

where: $\psi = 0.794\, \pi \sin \theta$
and R = magnitude of resultant vectors as a function of $\theta$ applicable to the H-V planes (one quadrant)
and
$$N_1^2 + N_2^2 + N_3^2 + N_4^2 + N_5^2 + N_6^2 + N_7^2 + N_8^2 + 2(N_1 N_2 + N_2 N_3 + N_3 N_4 + N_4 N_5 + N_5 N_6 + N_6 N_7 + N_7 N_8) \cos \Delta + 2(N_1 N_3 + N_2 N_4 + N_3 N_5 + N_4 N_6 + N_5 N_7 + N_6 N_8) \cos 2\Delta + 2(N_1 N_4 + N_2 N_5 + N_3 N_6 + N_4 N_7 + N_5 N_8) \cos 3\Delta + 2(N_1 N_5 + N_2 N_6 + N_3 N_7 + N_4 N_8) \cos 4\Delta + 2(N_1 N_6 + N_2 N_7 + N_3 N_8) \cos 5\Delta + 2(N_1 N_7 + N_2 N_8) \cos 6\Delta + 2(N_1 N_8) \cos 7\Delta = R^2 \quad \text{equation (4)}$$

where: $\Delta = 1.122\, \pi \sin \theta$
and R = magnitude of resultant vectors as a function of $\theta$ applicable to the diagonal plane (two quadrants).

Figure 5:
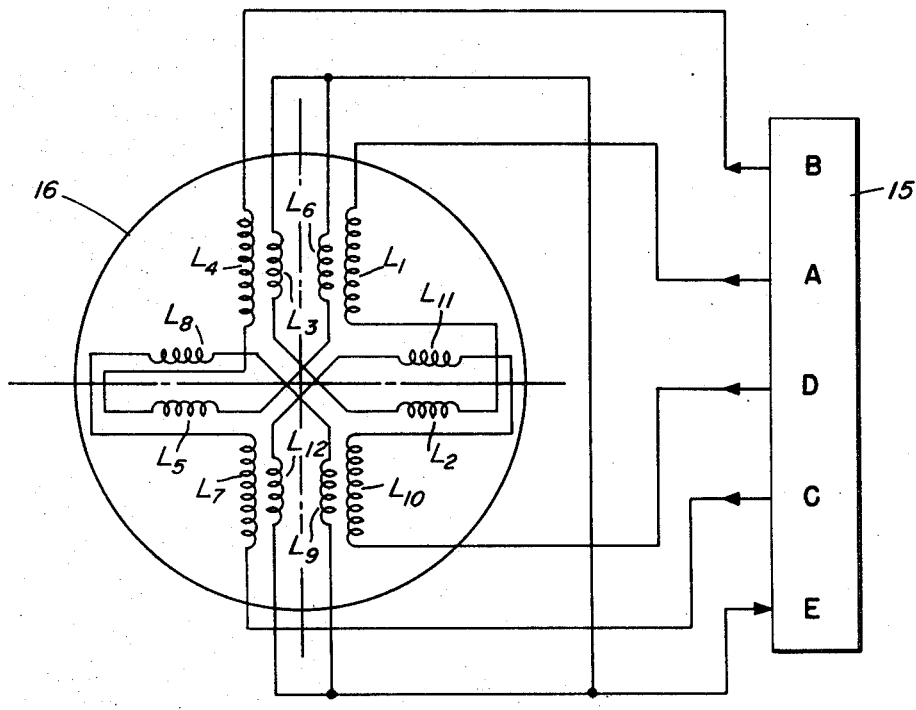
FIG. 5 illustrates the transducer winding relationship of the present invention wherein the output of each quadrant shares with part of the output of each adjacent quadrant.

Transducer 16 has four receiving circuits illustrated in FIG. 5 by circuits AE, BE, CE and DE. Each of the circuits form a series circuit with windings on all the elements in a particular quadrant and with windings on some of the elements in the two adjacent quadrants. Output circuit AE from the transducer to bridge and steering circuit 15 has, connected in series, windings $L_1$ in quadrant A wound on all the magnetostrictive elements in section A, windings $L_2$ wound on one column of magnetostrictive elements in quadrant D, and windings $L_3$ wound on the elements of one column of quadrant B. Similarly, output circuit BE has winding turns $L_4$, $L_5$ and $L_6$ connected in series and wound on elements in quadrants B, C, A respectively; circuit CE has series connected windings $L_7$, $L_8$ and $L_9$ wound on elements in quadrants C, B and D respectively; and output circuit DE is series wound on elements in quadrants D, A and C with windings $L_{10}$, $L_{11}$ and $L_{12}$ respectively.

When signals are received by the bridge and steering circuit 15, each signal A, B, C or D indicates the signal pattern from its respective quadrant, but the shading of some of the output from adjacent quadrants results in a wider region of correct steering and lower sensitivity at wide bearing angles. The four output signals are combined in any well known manner to provide the sum and difference signals for transducer halves.

Figure 6A:
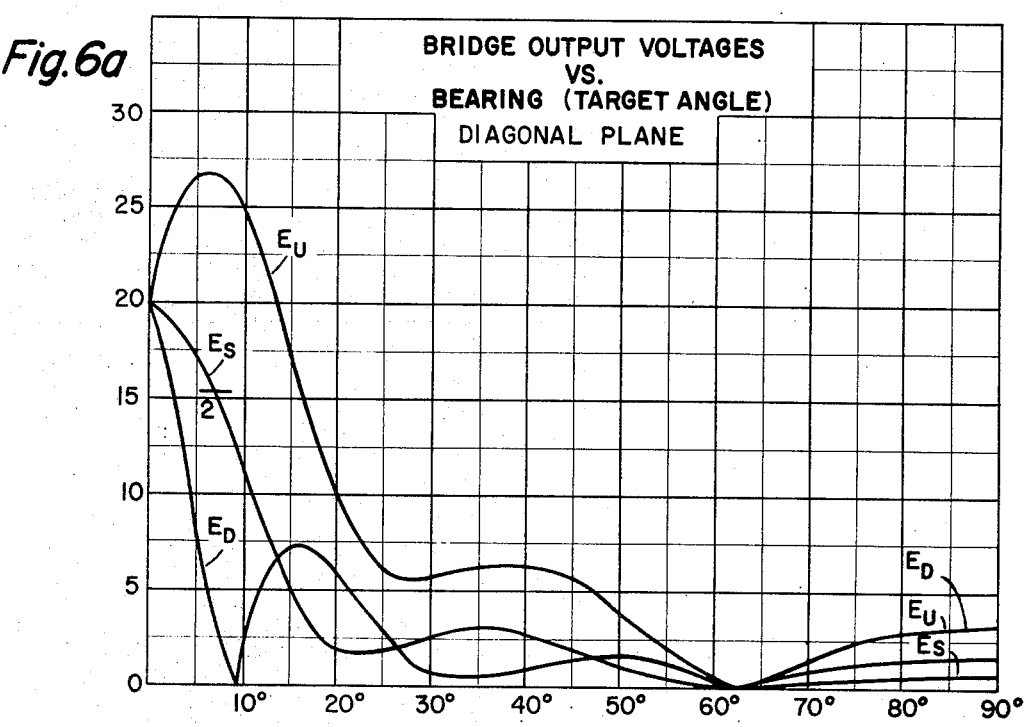
FIGS. 6a and 6b are graphs which illustrate bridge output voltages vs. bearing for a reference in the diagonal plane and horizontal or vertical planes respectively.

Bridge output voltages resulting from the transducer signals versus target bearing for a reference wave front in the diagonal plane are shown in FIG. 6a. The patterns which determine azimuth and vertical steering are given by:

$$E_R = P_{RL} + (Q/N) P_{sum}; \quad \text{equation (5)}$$

$$E_U = P_{UD} + (Q/N) P_{sum}; \quad \text{equation (6)}$$

$$E_L = -P_{RL} + (Q/N) P_{sum}; \text{ and} \quad \text{equation (7)}$$

$$E_D = -P_{UD} + (Q/N) P_{sum}. \quad \text{equation (8)}$$

where
$P_{sum} = e_a + e_b + e_c + e_d$ or sum pattern;
$P_{RL} = -j(e_b + e_c - e_a - e_d)$ or difference pattern for azimuth steering; and
$P_{UD} = -j(e_a + e_b - e_c - e_d)$ or difference pattern for vertical steering. The voltages $e_a$, $e_b$, $e_c$ and $e_d$ represent the voltages generated in their respective quadrants by a sound wave impinging on the transducer. The voltage gain in the "90° line" shown in FIG. 3b is represented by $Q$ in equations 5 to 8 while $N$ represents the step up turns ratio of a transformer (not shown) in the output circuitry. In FIG. 6a the ratio $Q/N$ is assumed equal to ½.

FIG. 6a shows the up and down voltages $E_U$ and $E_D$ for the magnetostrictive winding pattern shown in FIGS. 2a and 2b and also shows the sum voltage $E_S/2$ for the special case where either $E_R$ or $E_L$ is equal to $E_U$ and either $E_R$ or $E_L$ is equal to $E_D$. The $E_U$ and $E_D$ signals cross at a target angle greater than 60° but remain widely separated for angles less than 60°. It is noted at this point that the magnitude of the steering signal out of the bridge is proportional to the difference in magnitude of the $E_L$ and $E_R$ or $E_U$ and $E_D$ signals. False steering therefore does not arise until the outputs $E_U$ and $E_D$ cross, somewhere wider than 60°.

Figure 6B:
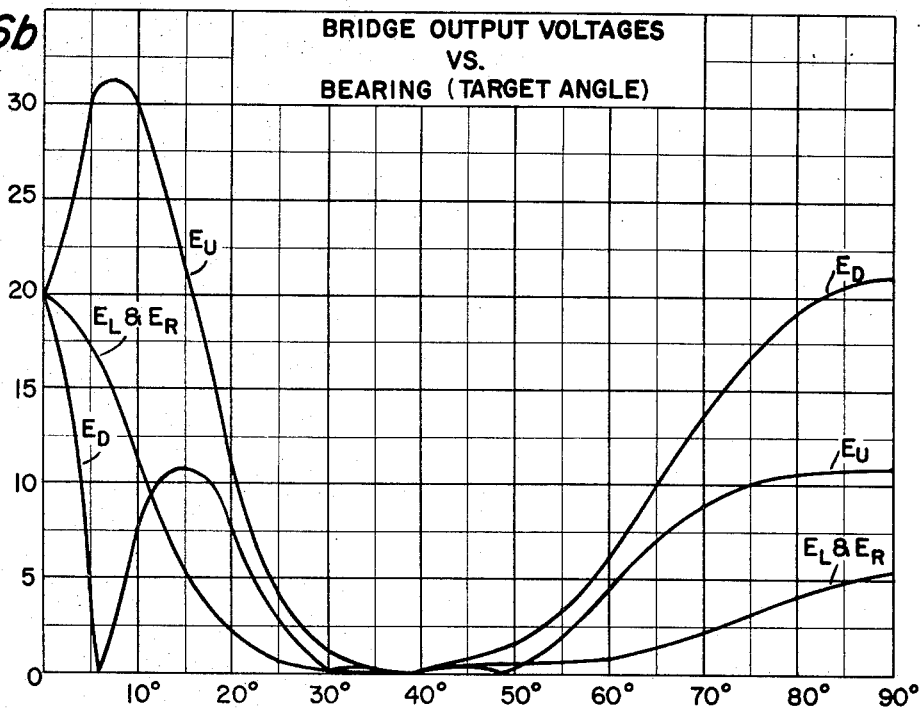

False steering occurs in FIG. 6b at approximately 40° for targets in the vertical plane. In this case the left voltage $E_L$ and right voltage $E_R$ are equal to each other. The up and down bridge output voltages $E_U$ and $E_D$ do not cross over until an angle greater than 35° is reached. The differences between $E_D$ and $E_U$ at target planes intermediate the H-V and 45° planes produce results which indicate a gradual transition of transducer characteristics between these planes.

Figure 7A:
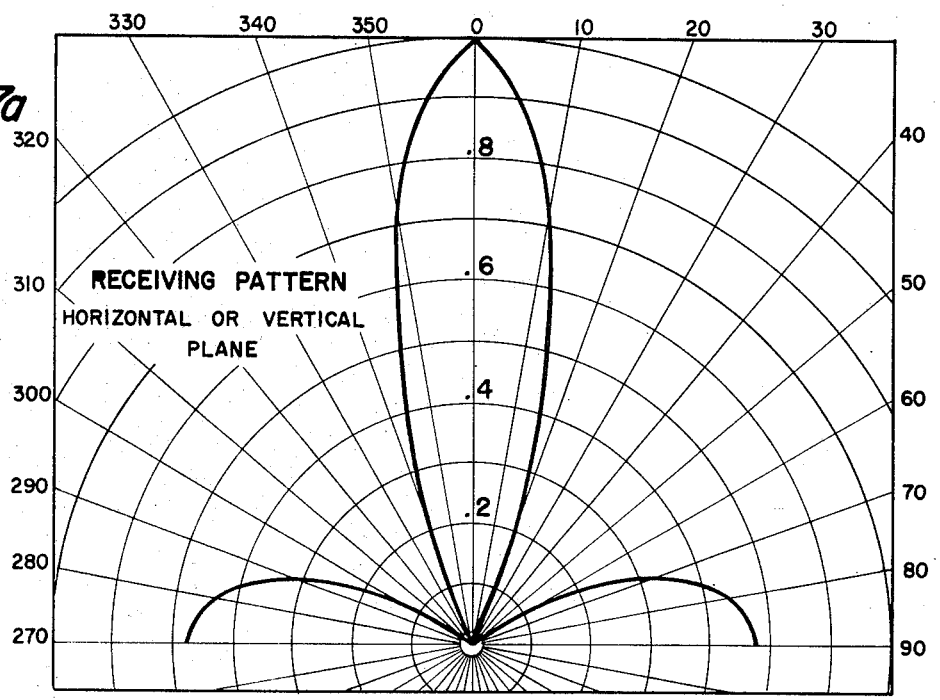
FIGS. 7a and 7b are graphs which illustrate resulting receiving amplitude patterns of the quadrants as a function of target angle for quadrants having the winding arrangement of one embodiment of the invention.
Figure 7B:
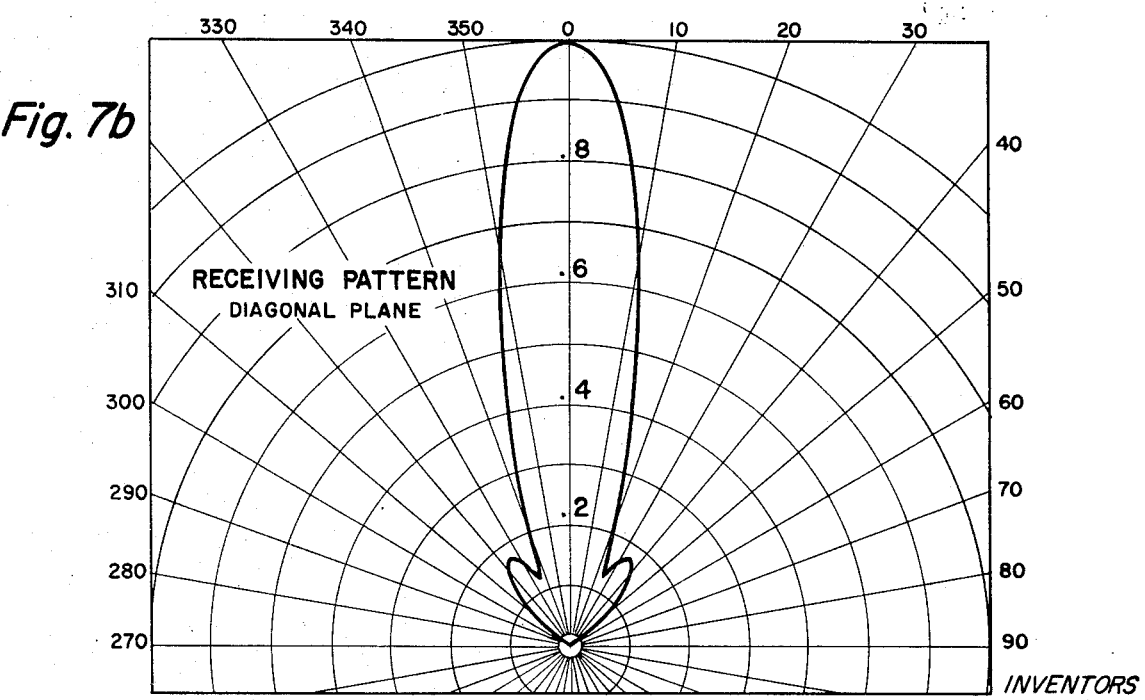

Receiving patterns on the transducer having the winding strengths of FIGS. 1 and 2 are illustrated in FIGS. 7a and 7b. FIG. 7b is the receiving pattern for one quadrant representing the relative amplitudes of the resultant vectors obtained from the individual stacks of magnetostrictive elements of the transducer. FIG. 7b represents the amplitudes of two quadrants with the winding turns shown in FIGS. 2a and 2b combined. The patterns of FIGS. 7a and 7b were obtained by solving the foregoing equations, Equation 3 and Equation 4 respectively.

Figure 8:
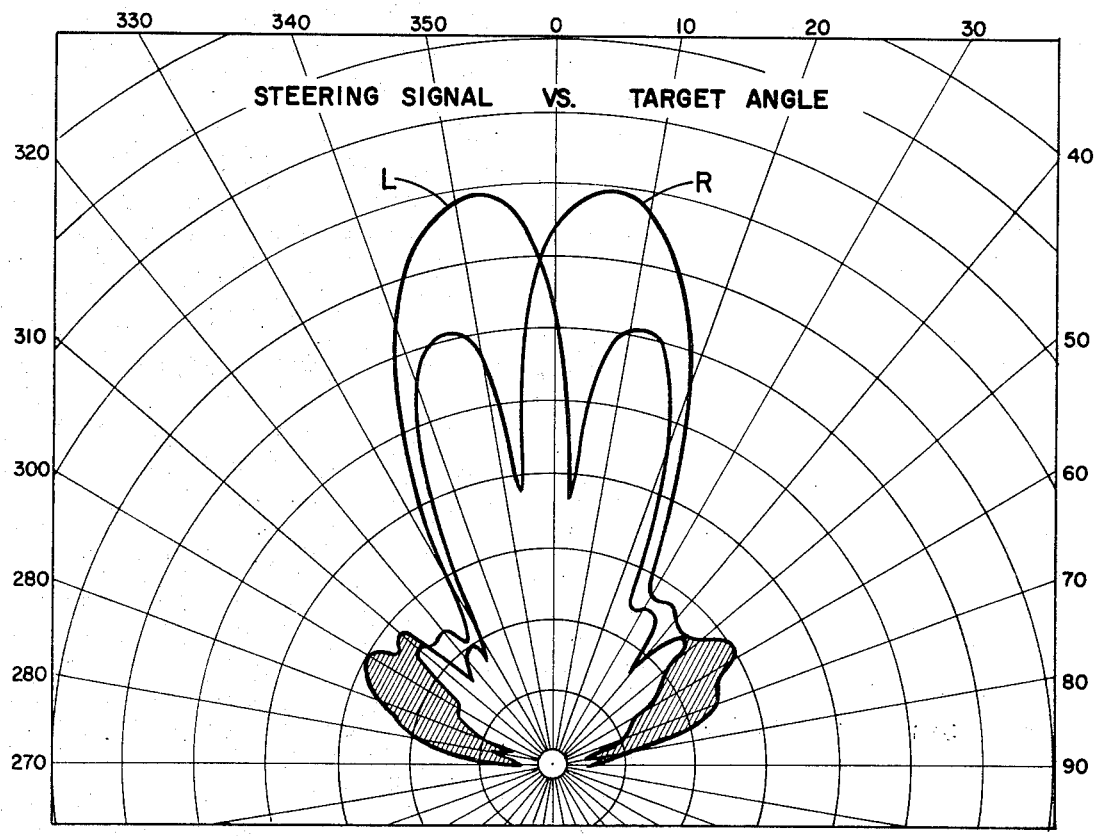
FIG. 8 is a graph illustrating steering signal voltage vs. target angles for right and left halves of a transducer with the shading arrangement of the invention.

Steering signals for the right and left halves of the transducer with a target in the horizontal plane are shown in FIG. 8. Both halves reach maximum sensitivity near the transducer center and correct steering is indicated up to the point of crossover, shown in the cross-sectional areas. The right half steering signal is correct to a bearing at 47° and the half does not reach the false steering region until approximately 313°. It can also be seen in the cross-hatched region for both halves that sensitivity is considerably reduced at wide angles over that of the prior art devices without transducer shading which tends to balloon outward into large signal lobes similar to that of the narrow angle lobes.

Figure 9:
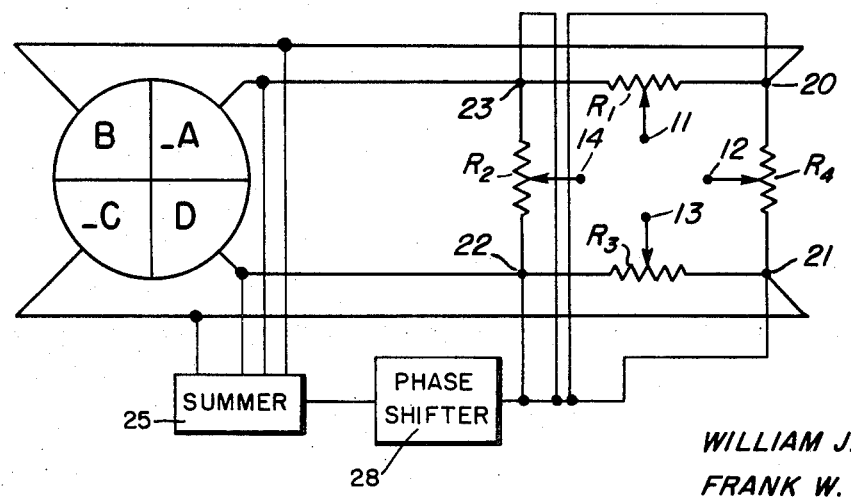
FIG. 9 illustrates the circuit relationship between a transducer and a bridge in obtaining sum and difference signals.

FIG. 9 shows a circuit used in obtaining sum and difference signals from the right and left and up and down halves of the transducer. The two quadrants A and C have turns connected in a reverse manner to generate a negative voltage. Quadrants A, B, C and D are connected to the input bridge points 21, 20, 22 and 23 respectively. Bridge outputs are taken from terminals 11–14 connected to resistors $R_1$, $R_4$, $R_3$ and $R_2$ respectively. The top and bottom outputs 11 (B + A) and 13 (−C + D) are used for horizontal homing while the right and left outputs 12 and 14 (−A + D and B − C) provide vertical homing. The difference in voltage for the right and left halves of the transducer therefore is (−C + D) less (B − A) or (A + D) − (B + C). Similarly the voltage difference for the up and down halves becomes (A + B) − (C + D). Transformers (not shown) in summer 25 are located between the transducer and bridge for reversing the polarity of signals to obtain a sum signal. The sum signal is passed through phase shifting means (phase shifter 28) to the four input points of the bridge to be added to the difference signals. The final steering signal is then proportional to the magnitude of the voltages.

From the foregoing it should now be evident that improved transducer shading is provided which extends the region of correct torpedo steering and which increases the probability of successful homing. The shading of one quadrant by the provision of windings on adjacent quadrants enables the transducer of the invention to be less sensitive to wide angle bearing signals and is less likely to produce false steering signals than are transducers of the past.

The description of one embodiment is not intended to limit the invention to the particular transducer described and obviously many other features and applications of the invention are contemplated. Ceramic pick-up elements might be substituted for the magnetostrictive elements and various stacking arrangements might be used. The specific number of elements, the number of turns on each element, and the spacing between elements may be varied. Any appropriate means for combining the sum and difference signals in obtaining steering signals may be used.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A transducer for providing sum and difference signals to output bridge circuitry comprising,
   a plurality of stacks of vibratory elements disposed in a planar array of rows and columns symmetrically divided into quadrants,
   a first electrical output circuit, a second electrical output circuit, a third electrical output circuit and a fourth electrical output circuit providing directivity patterns corresponding to first, second, third and fourth quadrants respectively,
   each of said output circuits having first, second and third sets of windings connected in series, each of said first sets of windings wound on the element stacks of a corresponding quadrant, each of said second sets of windings wound on a portion of the stacks in one adjacent quadrant, and each of said third sets of windings wound on a portion of the elements of the other adjacent quadrant.

2. The transducer of claim 1 wherein said vibratory elements are magnetostrictive elements.

3. The transducer of claim 1 wherein said portion of element stacks in one adjacent quadrant is in the column adjacent to said corresponding quadrant and said portion in the other adjacent quadrant is in the row adjacent to said corresponding quadrant.

4. The transducer of claim 3 wherein each quadrant contains eight stacks of magnetostrictive elements arranged, progressing from the transducer central axis outward, to have three equispaced stacks of elements in a first column, three equispaced stacks of elements in a second column, and two equispaced stacks of elements in a third column.

5. A homing system comprising the transducer of claim 1 further comprising,
   means connected to said output circuits vectorially summing said directivity patterns into a sum signal for transducer halves,
   means connected to the output of said summing means for phase shifting said sum signal to be in phase with a transducer difference signal,
   means connected to said transducer output circuits vectorially subtracting directivity patterns providing difference signals between transducer halves, and
   means connected between said subtracting means and said phase shifting means comparing said sum and difference signals and producing a steering signal output in response to a difference between said compared signals.

* * * * *